United States Patent [19]
>
> Hirabayashi et al.
>
> [11] 4,197,627
> [45] Apr. 15, 1980

[54] INTERFITTING APPARATUS

[75] Inventors: Hisaaki Hirabayashi; Koichi Sugimoto, both of Yokohama, Japan

[73] Assignee: Hitachi, Ltd., Japan

[21] Appl. No.: 934,718

[22] Filed: Aug. 21, 1978

[30] Foreign Application Priority Data

Feb. 6, 1978 [JP] Japan ................................ 53-11465

[51] Int. Cl.² ........................................... B25B 27/14
[52] U.S. Cl. ................................................ 29/281.5
[58] Field of Search ..................... 29/407, 281.5, 759, 29/714, 23

[56] References Cited

U.S. PATENT DOCUMENTS

| | | | |
|---|---|---|---|
| 3,526,943 | 9/1970 | Erhardt | 29/243.56 |
| 3,824,674 | 7/1974 | Inoyama et al. | 29/407 |
| 3,893,217 | 7/1975 | Edmond | 29/407 |
| 3,965,562 | 6/1976 | Inoyama | 29/407 |
| 4,048,687 | 9/1977 | Kato et al. | 29/407 |

*Primary Examiner*—James L. Jones, Jr.
*Attorney, Agent, or Firm*—Craig and Antonelli

[57] ABSTRACT

Interfitting apparatus including a fitting jig formed with a plurality of regulating openings each for receiving therein one of a plurality of shaft members having chamfered forward ends, which are objects of interest, to hold the shaft members by regulating their posture and allow them to move freely within tight tolerances, and a table at least slightly movable in a horizontal direction for supporting, by precision positioning, an object formed with a plurality of holes separated from one another by a spacing substantially the same as the spacing between the regulating openings of the fitting jig. In fitting the shaft members in the respective holes in the object, the fitting jig is moved in a vertical direction toward the table, and guiding members and guided members mounted in the fitting jig and the table respectively are brought into engagement with each other so that the former may guide the latter, to thereby allow the table to move slightly in the horizontal direction to effect positioning of the shaft members and the object horizontally relative to each other within the range of the chamfers. Thereafter the fitting jig is further moved in the vertical direction to interfit the shaft members and the holes in the object with each other by exerting a fitting force on the shaft members from outside a jamming area.

7 Claims, 12 Drawing Figures

INTERFITTING APPARATUS

BACKGROUND OF THE INVENTION

This invention relates to interfitting apparatus which enables at least one shaft member and at least one hole formed in an object, such as a bearing and a bearing box and a piston and a piston cylinder, to be interfitted with each other with a high degree of precision.

U.S. Pat. No. 3,824,674 discloses a tactile sensation interfitting apparatus which is known as an example of the prior art for interfitting a shaft and a hole with each other. More specifically, in this apparatus, a shaft portion is gripped by a clamping device including a spring or other soft object and a tactile sensor for detecting the manner of contact of the shaft portion with the hole portion. The relative positions of the shaft portion and the hole portion and their posture are calculated, and a predetermined probing operation is carried out according to the relations, so as to bring the shaft portion near to the hole portion. Then the shaft portion is forced against the hole portion while judging, by means of the sensor, whether or not the fitting is in progress. If the shaft portion is not fitted in the hole portion. Then, a predetermined probing operation for fitting the shaft portion in the hole portion is conducted so as to fit the former into the latter. The present practice of interfitting two members with each other is to use, as aforesaid, a system which combines the shaft clamping device including a spring and a sensor with a probing control using a sensor and an X-Y table. By this system, interfitting of a shaft and a hole with each other with a margin in the order of microns has been carried out by relying on what may be referred to as a tactile sensation robot. Some disadvantages are associated with this apparatus. Since the tactile sensation interfitting apparatus effects interfitting by performing a probing action under the control of the sensor and X-Y table, a mechanism for the X-Y table must be provided and at the same time a complex control system must be used for the sensor and the X-Y table. Thus the apparatus is both low in reliability and high in cost.

In the aforesaid tactile sensation apparatus of the prior art, it is impossible to perform so-called multishaft interfitting in which two or more shafts are simultaneously fitted in respective holes fixed relative to one another, because the shaft portions are each held by a clamping device comprising a spring or other soft object for free movement and it is impossible to effect positioning of the shafts and the holes with a sufficiently high precision to allow smooth interfitting. Assuming that this tactile sensation interfitting apparatus is used for effecting multishaft interfitting by fitting the shafts not simultaneously but one after another, it would be possible to effect interfitting of the first shaft and the first hole with each other, but the second shaft et. seq. could not be fitted in the holes because the shafts are mechanically restrained relative to one another as aforesaid and the fact that the clamping devices for the shafts are interconnected by the medium of springs or other soft objects makes it impossible to perform a probing operation.

SUMMARY OF THE INVENTION

An object of this invention is to provide an interfitting apparatus which uses a reliable and simplified mechanism for enabling interfitting of a shaft member which is an object of interest and a hole formed in an object with each other to be performed with a high degree of precision.

Another object is to provide an interfitting apparatus which enables two or more shafts, which are assembled and mechanically restrained relative to one another, and holes formed as a unit in a manner to correspond to the shafts, to be interfitted simultaneously.

According to the invention, the interfitting apparatus includes fitting jig means formed with a regulating opening for inserting therein one of a shaft member and an object formed with a hole for holding the same in a manner to allow its free movement within predetermined tolerances by regulating its posture, and table means at least slightly movable in a horizontal direction for supporting, by precision positioning, the other of the shaft member and the object. In interfitting the shaft member and the hole in the object with each other, the fitting jig means is simply moved downwardly or upwardly in a vertical direction toward the table means, and by so doing, rod-shaped guide members and guided members provided in the fitting jig means and the table means respectively are brought into engagement with each other, the guide members each chamfered at its forward end and having a constricted portion on the rear side of its shaft portion and the guided members each formed with a hole provided with a relief on its rear side by increasing the diameter. When in engagement with each other, the guiding members and the guided members allow the table means to move slightly in a horizontal direction to effect positioning of the shaft member and the object horizontally relative to each other within the range of the chamfer. Thereafter, the fitting jig means is simply moved vertically downwardly or upwardly, whereby the shaft member and the hole in the object can be interfitted with each other by a fitting force imparted from outside a jamming area. The aforementioned operation can be carried out in interfitting a plurality of shafts and a plurality of holes formed in the object with each other.

DETAILED DESCRIPTION OF THE PREFERRED EMBODIMENTS

Figure 1:
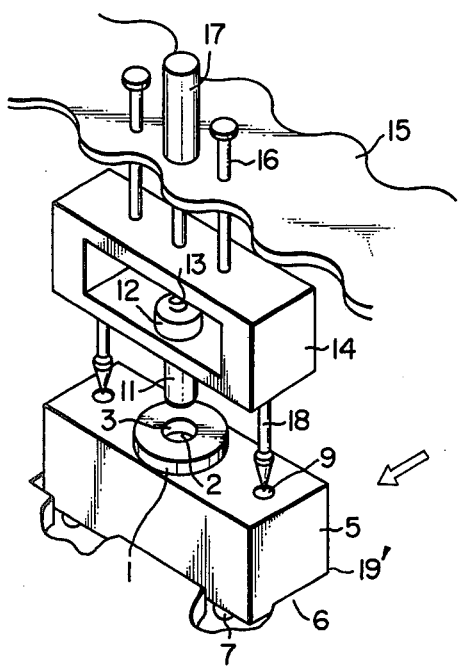
FIG. 1 is a perspective view of the interfitting apparatus comprising one embodiment of the invention in which one shaft and one hole are interfitted with each other.
Figure 2:
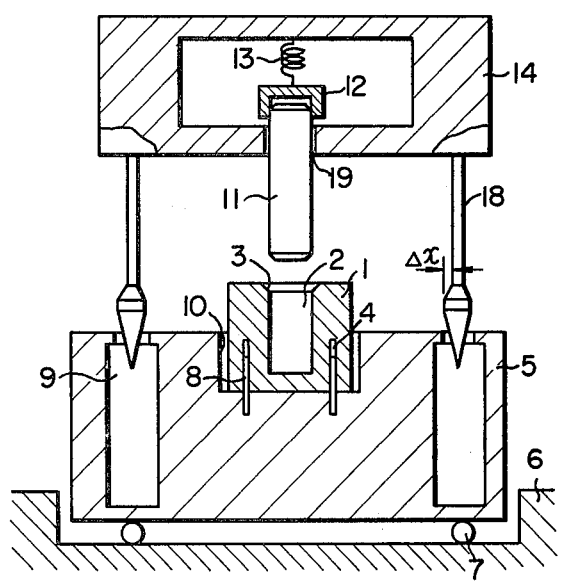
FIG. 2 is a central sectional view of FIG. 1.

FIG. 1 is a schematic perspective view of one embodiment of the interfitting apparatus in conformity with the invention in which one shaft and one hole are interfitted with each other, and FIG. 2 is a central sectional view of FIG. 1. 1 designates an object which is formed with a hole 2 having a large diameter D, which may be 30 to 100 mm, for example, as contrasted with a depth, which may be about 90 to 300 mm, for example, with a high degree of precision with respect to knock pin holes 4, for example, which serve as a standard. The hole 2 is chamfered at its entrance at 3. 5 designates a table for clamping the object 1 formed in its central portion with a recess 10 having a pair of knock pins 8 of a small diameter attached thereto for positioning the object 1 with a high degree of precision when snugly inserted in the respective knock pin holes 4 formed in the object 1. The table 5 is formed in opposite side portions with a pair of guide pin receiving holes 9 each provided with a relief by increasing the diameter of a lower portion thereof, and is supported by bearings 7 for horizontal sliding movement on a base 6. 11 designates a shaft member, which is an object of interest, having a diameter d and adapted to be fitted in the hole 2 formed in the object 1. 12 designates a chuck which is supported by a spring 13 for free horizontal movement and holds an upper end of the shaft member 11 as by vacuum adhesion, electromagnetic adhesion, etc. 14 designates a fitting jig supported by a top plate 15 for vertical movement along guide rails 16 and connected to a piston rod inserted in a cylinder 17. The fitting jig 14 has attached to the underside of opposite side portions thereof a pair of guide pins 18 each chamfered at its forward end to provide a pointed end and having a constricted portion in its upper shaft portion formed by reducing its diameter. The fitting jig 14 is formed with a regulating opening 19 for loosely receiving therein a shaft portion of the shaft member 11 with a predetermined clearance therebetween, in order to regulate the movement or posture of the shaft member 11.

Figure 3A:
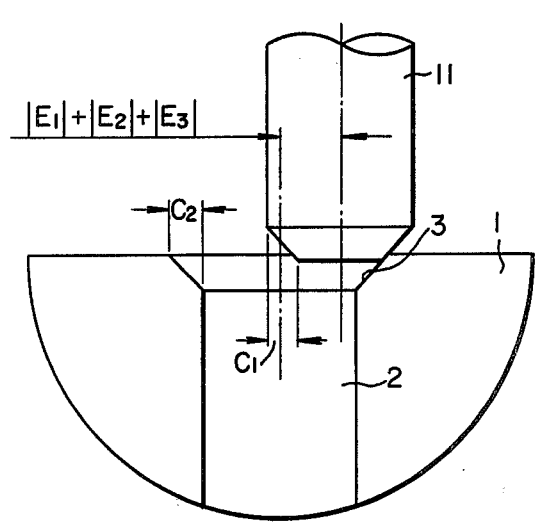
FIG. 3a is a view showing the condition for positioning a shaft member and a hole relative to each other.
Figure 3B:
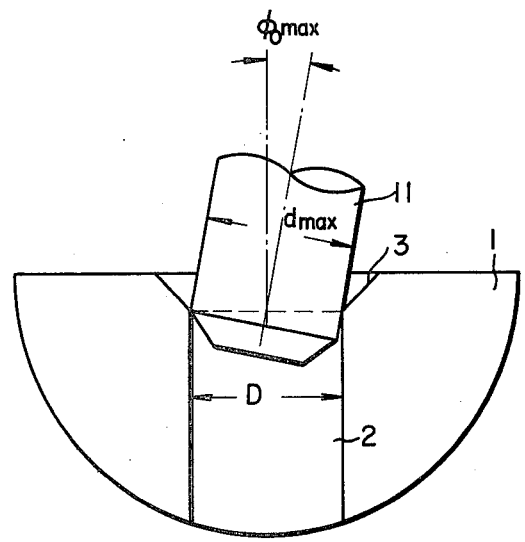
FIG. 3b is a view showing the condition for determining the posture of the shaft member and the hole.

In operation, the object 1 for carrying out interfitting is placed, either manually or automatically, in the recess 10 formed in the object clamping table 5, and the object 1 is pushed downwardly so that the knock pins 8 attached to the table 5 may be snugly fitted in the knock pin holes 4 formed in the object 1 so as to position the latter. Then the object clamping table 5 is moved from the direction of an arrow shown in FIG. 1 to an interfitting station located at an end 19' of the base 6 in which the table 5 becomes stationary. The top plate 15 is adapted to move horizontally in reciprocatory movement between a supply station, not shown, for the object 11 of interest, and the interfitting station. The shaft member 11, which is the object of interest, is conveyed as by a parts feeder to the supply station, where a forward end of the shaft member 11 is inserted in the regulating opening 19 as the piston rod is moved downwardly by the operation of the cylinder 17 while its rearward end is held by the chuck 12. Then the top plate 15 moves from the supply station to the interfitting station and stops, thereby placing the shaft member 11 above the object 1. Thereafter, the cylinder 17 is again actuated to move the fitting jig 14 downwardly, and a pointed conical portion at the forward end of each guide pin 18 enters the upper end of one of the guide pin receiving holes 9, thereby moving the object clamping table 5 horizontally to adjust its position. Upon further downward movement of the fitting jig 14, the maximum diameter shaft portion of each guide pin 18 is snugly fitted in one of the guide pin receiving holes 9, with the result that the object 1 and the fitting jig 14 are positioned relative to each other with respect to the horizontal. At this time, the chamfer at the forward end of the shaft member 11 and the chamfer at the entrance to the hole 2 are in close proximity to each other and juxtaposed against each other [as shown in FIG. 3a], because the amount of movement of the shaft member 11 is regulated by the regulating opening 19. If the shaft portion 11 moves downwardly a great distance, the maximum diameter shaft portion of each guide pin 18 will reach the relief (increased diameter portion) of one of the guide pin receiving holes 9, and the constricted portion of each guide pin 18 will be positioned in the minimum diameter portion at the entrance to one of the guide pin receiving holes 9. Thus the table 5 is placed in a position in which it can move slightly in the horizontal direction $\Delta x$. As the object 1 moves slightly in the horizontal direction together with the table 5 with the chamfer at the forward end of the shaft member 11 and the chamfer at the entrance to the hole 2 serving as a guide, the shaft member 11 is introduced into the hole 2 while being maintained in a vertical position by the regulating opening 19. When the shaft member 11 is fitted in the hole 2, an interfitting operation is completed.

Unless the maximum diameter shaft portion of each guide pin 18 is fitted snugly in one of the guide pin receiving holes 9 in such a manner that there is no clearance therebetween, a difficulty may be encountered in bringing the chamfer at the forward end of the shaft member 11 and the chamfer 3 at the entrance to the hole 2 into a region in which they are in contact with each other. The provision of the constricted portion in each guide pin 18 and the relief in each guide pin receiving hole 9 enables the table 5 to move slightly in the horizontal direction, whereby an error between the center axis of the shaft member 11 and the center axis of the hole 2 can be corrected.

A problem raised at this point is mainly with regard to the precision with which the regulating opening 19 is formed in the fitting jig 14. In order to fit the shaft member 11 in the hole 2, the following four conditions must be satisfied. The parts which constitute the objects of the conditions will be defined as follows:

(a) The maximum value of the outer diameter of the shaft portion of the shaft member 11 is denoted by $d_{max}$.
(b) The minimum value of the outer diameter of the shaft portion of the shaft member 11 is denoted by $d_{min}$.
(c) The length of the shaft portion of the shaft member 11 is denoted by L.
(d) The amount of chamfer at the forward end of the shaft portion 11 is denoted by $C_1$.
(e) The maximum value of the inner diameter of the hole 2 formed in the object 1 is denoted by $D_{max}$.
(f) The minimum value of the inner diameter of the hole 2 formed in the object 1 is denoted by $D_{min}$.
(g) An error in position between the hole 2 formed in the object 1 and the knock pin receiving holes serving as a standard is denoted by $E_1$.
(h) An error in the relative positions of the knock pins 8 and the regulating opening 19 through the guide pins 18 and the guide pin receiving holes 9 is denoted by $E_2$.

(i) The amount of chamfer at the entrance to the hole 2 formed in the object 1 is denoted by $C_2$.

(j) The inner diameter of the regulating opening 19 is denoted by $D'$.

(k) The length (width) of the regulating opening 19 is denoted by W.

(l) The friction angle is denoted by $\lambda (= \tan^{-1} \mu$ where $\mu$ is the static friction coefficient).

(A) Condition for Positioning

When the forward end of the shaft portion of the shaft member 11, which is the object of interest, is brought into contact with the entrance to the hole 2 formed in the object 1, they should be within the range of the chamfer of each other. With regard to a length $L'$ of the shaft portion of the shaft member 11 which is obtained by eliminating the chamfer at the forward end thereof from the length L, the following equation (1) holds in view of the aforesaid definition.

$$L' = L - 2C_1 \tag{1}$$

With regard to the maximum value $\phi'$ max of the angle of inclination of the shaft portion of the shaft member 11 due to the presence of a clearance between the regulating opening 19 and the shaft portion, the following relation holds in view of the aforesaid definition:

$$\phi' \max = (D' - d_{min})/W \tag{2}$$

A positional error $E_3$ at the forward end of the shaft portion of the shaft member 11 due to the clearance in the regulating opening 19 can be expressed by the following equation from equations (1) and (2):

$$E_3 = L' \times \phi' max - (D' - d_{min})/2 \tag{3}$$
$$= (L 1 - 2C_l)(D' - d_{min})/W - (D' - d_{min})$$

Since the positioning condition is that the accumulated total of the positional errors is included in the chamfers, it is necessary that the condition for determining the relative positions of the shaft member 11 and the object 1 must satisfy the following equation (4):

$$|E_1| + |E_2| + |E_3| \leq C_1 + C_2 \tag{4}$$

(B) Condition for Determining Posture

The degree of inclination of the shaft member 11 allowable by the regulating opening 19 is such that the shaft portion at the forward end of the shaft member 11 has a size large enough to be able to be located at the entrance to the hole 2. That is, the maximum value $\phi_o$ max of the angle of inclination at which the forward end portion of the shaft member 11 can be inserted in the entrance to the hole 2 has the relation expressed by equation (5) in view of the aforementioned definition:

$$\phi_o \max = \cos^{-1}(d_{max}/D_{min}) \tag{5}$$

Therefore, it is necessary to determined the posture in such a manner that the angle of inclination $\phi'$ max of the shaft member 11 given by the regulating opening 19 from the relation of equation (2) is smaller than $\phi_o$ max as indicated by the following equation (6):

$$\phi' \max \leq \phi_o \max \tag{6}$$

(C) Condition for Fitting

Figure 4A:
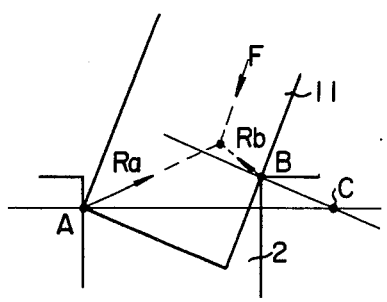
FIGS. 4a, 4b and 4c are views showing the manner in which conditions for the jamming of the shaft member into the hole are shown.
Figure 4B:
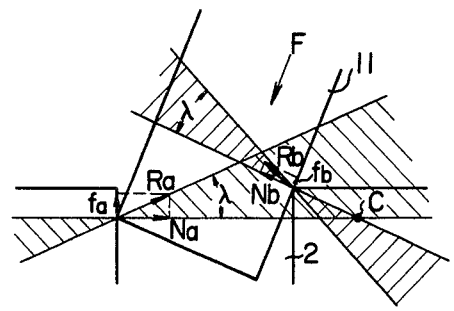
Figure 4C:
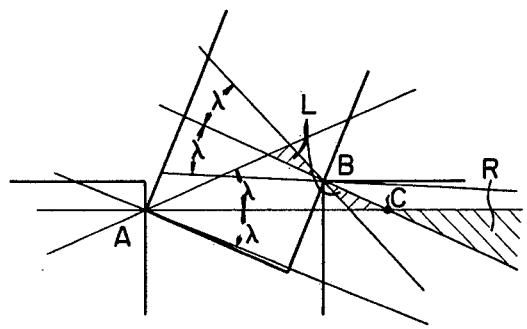

After the shaft portion at the forward end of the shaft member 11 is disposed in the entrance to the hole 2, it is necessary that an interfitting condition be satisfied from the point of view of dynamics in such a manner that the fitting of the shaft member 11 in the hole 2 progresses smoothly without the former jamming into the latter upon a pressure being applied to move the shaft member 11 downwardly. More specifically, when the shaft member 11 and the hole 2 in the object 1 are considered to be rigid objects and they are interfitted with each other, an external force F is exerted on the shaft member 11 and reactions Ra and Rb are exerted from points A and B respectively. The condition under which the shaft member 11 jams into the hole 2 and becomes stationary is that, as shown in FIG. 4a, the lines of actions of the three forces F, Ra and Rb intersect at one point. More specifically, if the instantaneous center of the movement of the shaft member 11 which is the object of interest taking place in contact with the hole 2 is located at a point C as shown in FIG. 4b, the lines of action of the reactions Ra and Rb can be located only in areas indicated by rightwardly descending and rightwardly ascending inclined lines respectively which are limited by a friction angle $\lambda$, when the external force F shows a lefthanded (counterclockwise) moment about point C. This is because the reactions Ra and Rb can be broken down into upwardly directed friction forces fa and fb and vertical drags Na and Nb respectively. Therefore, since the area in which the point of intersection of the lines of action of the reactions Ra and Rb exists is a common area for the two inclined line portions, no jamming of the one into the other occurs and interfitting is carried out smoothly when the line of action of the external force F does not pass through this area. When it passes through this area, then the lines of action of the three forces intersect at one point and the resultant of the three forces becomes zero, so that jamming occurs. This is because a friction force has a property such that it can change itself as opposed to an external force in the area of its friction angle. Thus, as shown in FIG. 4c, L indicates a lefthanded jamming area and R indicates a righthanded jamming area, with respect to the instantaneous center or point C.

Figure 5:
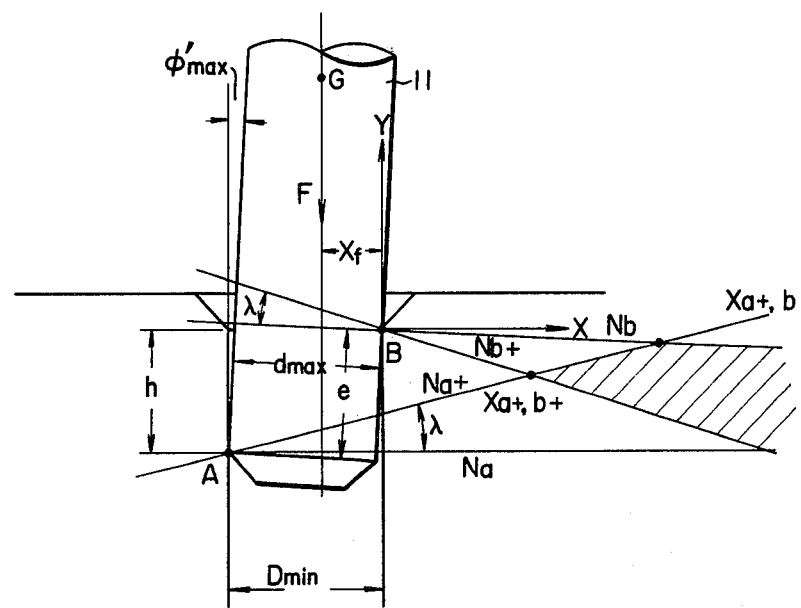
FIG. 5 is a view showing the condition for the shaft member to jam into the hole.

The maximum inclination of the shaft portion of the shaft member 11 is given by a clearance between the shaft member 11 and the regulating opening 19. Therefore, it is only after the shaft member 11 has been fitted in the hole 2 to depths e and h as shown in FIG. 5 that a condition is created in which whether or not the shaft member 11 is brought into contact with the hole 2 at points A and B to cause jamming of the former into the latter. Until the shaft portion 11 is inserted to the aforesaid depths, the shaft member 11 can be inserted smoothly into the hole 2 formed in the object 1 by moving the former downwardly without the former jamming into the latter, because a contact therebetween occurs only at point A or B. The depths of insertion e and h can be obtained from the following equations (7) and (8), respectively, from the relation between the maximum value of inclination $\phi'$ max of the shaft portion of the shaft member 11 and $D_{min}$ and $d_{max}$:

$$e = (D_{min} - d_{max} \cdot \cos \phi' \max)/\sin \phi' \max \tag{7}$$

$$h = \sqrt{d^2\max + e^2 - D^2\min} \tag{8}$$

When point B is taken as the origin of the X, Y coordinates, the X-coordinate Xa+, b of the point of intersection of a straight line Na+ and a straight line Nb of the jamming area can be expressed by the relation shown by equation (9), and the X-coordinate Xa+, b+ of the point of intersection of the straight line Na+ and a straight line Nb+ has a relation expressed by equation (10) as follows:

$$Xa+, b = -(D_{min} \cdot \tan \lambda - h)/(\tan \lambda + \tan \phi'max) \quad (9)$$

$$Xa+, b+ = -(D_{min} \cdot \tan \lambda - h)/[\tan \lambda + \tan(\phi'max + \lambda)] \quad (10)$$

Thus, in order that the shaft member 11 may be inserted in the hole 2 to a depth greater than the depths e and h without jamming occurring therebetween, the X-coordinate Xf of a force acting on the shaft member 11 has only to satisfy the relation shown by equation (11) as follows:

$$-D_{min} - \min [Xa+, b, Xa-, b+] < \quad (11)$$
$$Xf < \min [Xa+, b, Xa+, b+]$$

For example, if the force F acting on the shaft member 11 is only the gravity acting thereon, then Xf has a relation shown by equation (12) as follows:

$$Xf = -D_{min} + [(L'/2) \sin \phi'max + (d_{max}/2) \cos \phi'max] \quad (12)$$

Let as assume, for example, as follows:
$d_{max}$=49.975 mm, $d_{min}$=49.95 mm, $C_1$=0.5 mm, L=101 mm, $D_{max}$=50.025 mm, $D_{min}$=50.000 mm, $E_1$=±50 μm, $E_2$=±50 μm, D'=50.050 mm, $C_2$=0.5 mm, W=40 mm, and λ=0.16 rad.
Then, the following conditions can be obtained.

(A) Condition for Positioning
From Equations (3) and (4) set forth hereinabove, the condition $(L-2C_1)(D'-d_{min})/W-(D'-d_{min})/2 \leq C_1+C_2-|E_1|-|E_2|$ becomes $0.2 \leq 0.8$ and can be fully satisfied.

(B) Condition for Determining Posture
From equations (2) and (5) set forth hereinabove, the condition $(D'-d_{min})/W \leq \cos^{-1} (d_{max}/D_{min})$ becomes $0.0025$ rad $\leq 0.0317$ rad and can be fully satisfied.

(C) Condition for Fitting
From equations (7) and (8), $h = \sqrt{d^2max + (D_{min} - d_{max} \cdot \cos \phi'max) 2/\sin^2 \phi'max - D^2min}$
$= 9.87$ mm
$Xa+, b = -(D_{min} \cdot \tan \lambda - h)/(\tan \lambda + \tan \phi'max) = 1.79/0.0164$
$= 10.9$ mm
$Xa+, b+ = -(D_{min} \cdot \tan \lambda - h)/[\tan \lambda + \tan (\phi'max + \lambda)]$
$= 1.79/0.325 = 5.5$ mm Accordingly, If $-55.5$ mm$<Xf<5.5$ mm, the shaft member 11 can be inserted in the hole 2 without jamming thereinto. That is, if the vertically criented force F is exerted on the shaft member 11, which is the object of interest, at any point thereof, it is possible to fit the member 11 into the hole 2 smoothly without the former jamming into the latter.

Another embodiment of the invention in which multi-shaft-multihole interfitting is carried out will now be described by referring to FIGS. & AND ). A cylindrical object 1a is formed with three holes 2a, 2b and 2c which have a diameter D and spaced apart from one another an angle of 120°, for example. Positioning knock pin receiving holes 4 are formed in two positions on the underside of the object 1a. 5a designates a pallet having attached thereto a single knock pin 8 of a small diameter adapted to be snugly fitted in one of the knock pin receiving holes 4 formed in the cylindrical object 1a for positioning the object 1a with a high degree of precision. The pallet 5a has secured to a predetermined position thereon a cylindrical member 21 formed with a hole 20 for fitting therein the cylindrical object 1a with a clearance of about 0.2 mm therebetween, and has formed integrally on opposite end portions on the upper surface thereof a pair of guide pin receiving tubular members 9. A pair of positioning openings 22 are also formed in the pallet 5a. 23 designates a table supported through bearings 7 on an upper end of an elevatory member 24 for free movement in the directions of X-axis and Y-axis and in the direction of rotation, and having attached to its upper surface tapering pins 25 adapted to fit in the positioning openings 22 formed in the pallet 5a for relatively positioning the pallet 5a and the table 23. The maximum amount of movement of the table 23 relative to the elevatory member 24 is regulated by pins 26 attached to the upper end of the elevatory member 24 and positioned against holes formed in the table 23. The elevatory member 24 has secured to its underside two guide shafts 30 supported for vertical sliding movement by bearings 29 mounted at a lower frame 28, and is connected to a piston rod 32 of a cylinder 31 mounted at the central portion of the lower frame 28. Each of the guide shafts 30 has attached to its lower end a flange 33 which abuts against a lower end of one of the bearings 29 to serve as a stopper.

Figure 6:
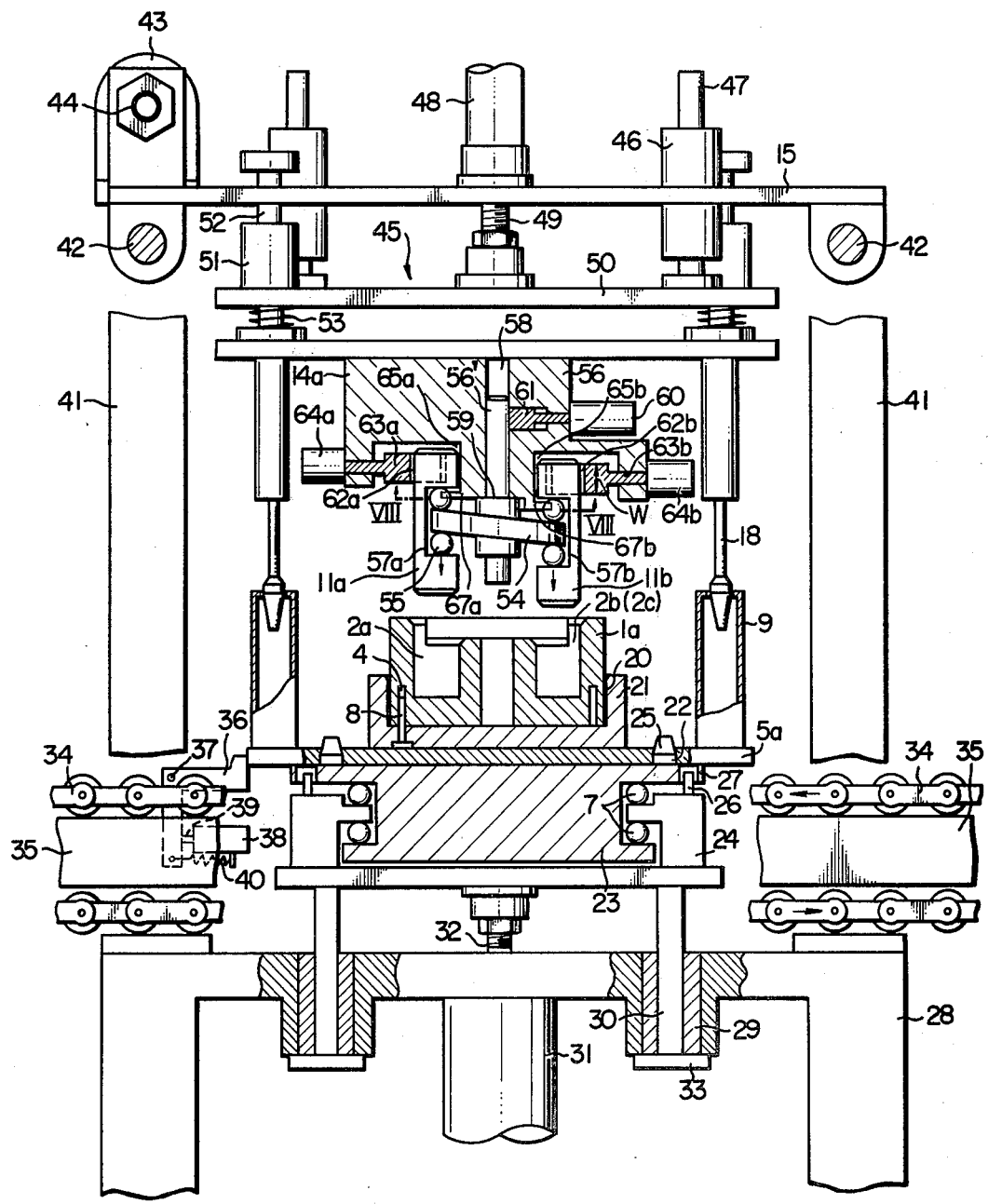
FIG. 6 is a front sectional view of the interfitting apparatus comprising another embodiment of the invention in which multishaft fitting can be effected.

34 designates a chain conveyor for conveying the pallet 5a by placing the latter thereon which moves in a direction indicated by arrows shown in FIG. 6. 36 designates a stopper adapted to abut against the pallet 5a conveyed by the chain conveyor 34 and stop its movement, the stopper 36 being in the form of a letter L and pivotally supported by a pin at 37 with one end thereof being connected to a piston rod 39 of a cylinder 38 and having a spring 40 mounted thereon. The top plate 15 is supported for sliding movement in the directions of arrows shown in FIG. 7 on rails 42 mounted on upper ends of posts 41 mounted in upstanding positions at the upper surface of the lower frame 28, and is connected to a forward end of a piston rod 44 fitted in a cylinder 43 mounted at the top of one of the upstanding posts 41. 45 designates a fitting jig having attached to its upper end guide rods 47 supported for vertical movement by a pair of bearings 46 mounted at opposite ends of a diagonal on the top plate 15, and having a plate 50 connected to a piston rod 49 fitted in a cylinder 48 secured to the middle of the top plate 15 and a main body portion. The main body portion 56 includes guide rods 52 supported for vertical movement by a pair of bearings 51 mounted at opposite ends of a diagonal on the plate 50 and extending upwardly above the top plate 15. Each of the guide rods 52 has a spring mounted between the plate 50 and the main body portion 56 to function as a shock absorber. A pair of guide pins 18, each in the form of a cone having a pointed end and formed with a constricted portion, are attached to opposite sides of the underside of the main body portion 56, and three pistons 11a, 11b and 11c assembled with an inclined disk 54 through bearings 55 are supported by the main body portion 56.

ment therein, and a fitting force including the weight of the shaft member 11 is exerted on the shaft member 11 in a vertical direction which is along the axis of the regulating opening 19. The object 1 formed with the hole 2 for fitting the shaft member 11 therein is placed on the table 5 which can freely move in sliding movement in a horizontal plane, by precisely positioning the object 1 by means of the knock pin holes 4 and the knock pins 8, for example. The guide pin receiving holes 9 or guide pins 18 formed on the table 5 and the guide pins 18 or guide pin receiving holes 9 formed on the fitting jig 14 are interfitted with each other by allowing pointed ends of the pins to guide the movement of the members, so that the shaft member 11 supported by the fitting jig 14 and the hole 2 formed in the object 1 placed on the table 5 are relatively positioned between the region of the chamfer formed at the forward end of the shaft member 11 and the region of the chamfer 3 formed at the entrance end of the hole 2. While the shaft member 11 and the hole 2 are in this condition, interfitting of the shaft member 11 and the hole 2 is smoothly carried out, without the former jamming into the latter, by the aforesaid fitting force imparted from outside the jamming area, thereby completing an interfitting operation.

In the embodiments described hereinabove, the shaft member is inserted in the regulating opening for regulating the posture of the shaft member including its horizontal position and its inclination. However, the invention is not limited to this arrangement, and that the same result can be achieved by inserting a chuck for gripping the shaft member in the regulating opening, in place of the shaft member itself.

As aforesaid, the invention enables interfitting of a shaft member, which is the object of interest, and a hole formed in an object to be effected satisfactorily, by merely moving downwardly a fitting jig which grips the shaft member and which is formed with a regulating opening for regulating the posture of the shaft member and by exerting on the shaft member a fitting force. As compared with a tactile sensation interfitting apparatus of the prior art, the apparatus according to the invention is very simple in construction and markedly improved in reliability.

The present invention can achieve the result of effecting automatic assembling of parts or interfitting of a plurality of shafts and a plurality of holes with each other which has been impossible to achieve by a tactile sensation interfitting apparatus of the prior art because of mechanical restraint.

We claim:

1. Interfitting apparatus comprising:

fitting jig means formed with a regulating opening for receiving therein one of a shaft member having a chamfered forward end and a holed member formed with a hole chamfered at its entrance, said fitting jig means holding said one member in said regulating opening in such a manner that the posture of said one member is regulated in a manner to move freely within tight tolerances and the axis thereof is substantially vertically oriented;

table means mounting thereon the other member by positioning the same with a high degree of precision and supported for slight movement in a horizontal direction;

means for vertically moving said fitting jig means to cause said hole formed in said holed member and said shaft member to move toward each other; and guide means comprising guiding members and guided members mounted at said fitting jig means and said table means respectively, said guiding members and said guided members being brought into engagement with each other prior to the engagement of said shaft member with the hole in said holed member when said fitting jig means moves toward said table means, and the guided members being guided by the guiding members to move the table means slightly in a horizontal direction to position the shaft member and the holed member relative to each other in such a manner that they are juxtaposed against each other within the range of the chamfers, so that said table means can move in a horizontal direction within a predetermined relief range when the chamfers of the shaft member and the hole begin to come into engagement with each other;

said fitting jig means being further moved vertically so that said one member may fit in said the other member by utilizing the chamfer-to-chamfer engagement whereby interfitting of the shaft member and the hole in the holed member can be effected by means of a fitting force exerted on the shaft member from outside a jamming area.

2. Interfitting apparatus as claimed in claim 1, wherein said guiding members of said guide means are rod-like members each chamfered at its forward end and formed with a constricted portion on the rear side of a shaft portion of a maximum diameter thereof, and said guided members thereof are holes each formed with a relief in its rearward portion.

3. Interfitting apparatus as claimed in claim 1, wherein the X-coordinate $X_f$ of said fitting force exerted from outside said jamming area satisfies $-D_{min-min}$ [$X_{a+}$, b, $X_{a+}$, b+]$<X_f<$min [$X_{a+}$, b, $X_{a+}$, b+] where:

$X_{a+}, b = -(D_{min} \cdot \tan \lambda - h)/(\tan \lambda + \tan \phi'max)$
$X_{a+}, b+ = -(D_{min} \cdot \tan \lambda - h)/\tan \lambda + \tan (\phi'max + \lambda)$ $h = \sqrt{d^2max + [(D_{min} - d_{max} \cdot \cos\phi'max]/\sin \phi'max]^2} - D^2min$
$\phi'max = (D' - d_{min})/W$ $D_{min}$ is the minimum value of the inner diameter of the hole in the holed member;
$\lambda$ is the friction angle;
$d_{max}$ is the maximum value of the outer diameter of a shaft portion of the shaft member;
$D'$ is the inner diameter of the regulating opening;
$W$ is the length of the regulating opening.

Figure 8:
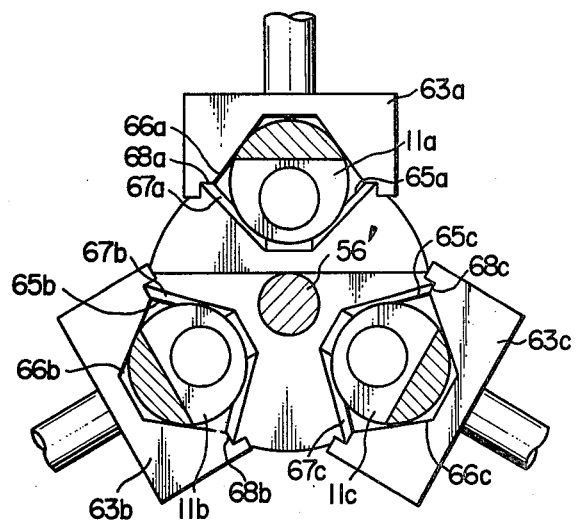
FIG. 8 is a view as seen in the direction of arrows VIII—VIII in FIG. 6.
Figure 9:
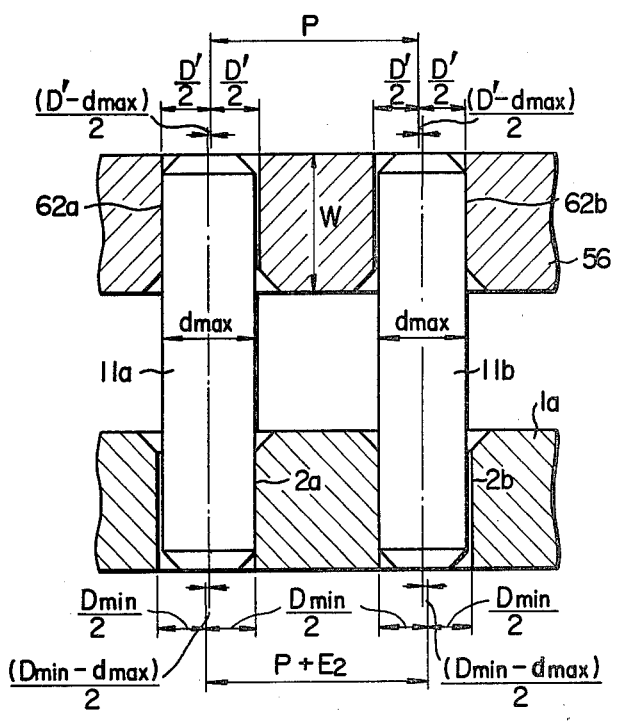
FIG. 9 is a view showing displacements in the relative positions of the shafts and the holes when a multishaft interfitting operation is completed.

4. Interfitting apparatus comprising:

fitting jig means formed with a plurality of regulating openings formed integrally and located in side-by-side relation each for receiving therein one of a plurality of shaft members each chamfered at its forward end and constituting an object of interest, said fitting jig means holding said shaft members in said regulating openings in such a manner that the posture of the shaft members is regulated in a manner to move freely within tight tolerances and the axes thereof are substantially vertically oriented;

table means mounting thereon, by precision positioning, an object formed with a plurality of holes located in side-by-side relation and separated from one another by a spacing substantially the same as the spacing between the regulating openings, said The objects of interest are constituted by inserting the bearings 55, mounted on opposite sides of the inclined disk 54 secured to a shaft 56', in grooves 57a, 57b and 57c formed in the central portions of the pistons 11a, 11b and 11c respectively. The shaft 56' extends through a bore 58 formed in the middle of the main body portion 56 of the fitting jig 45 and has a flange positioned at its end surface 59 against the lower end of the main body portion 56. A cylinder 60 has inserted therein a piston rod having attached to its forward end an arcuate concave surface to act as a chuck means for gripping the shaft 56' to hold the same stationary or releasing the same to allow its movement. The main body portion 56 of the fitting jig 45 is formed on its underside with regulating openings 62a, 62b and 62c which are disposed at the same pitch as the holes 2a, 2b and 2c for regulating the positions of the pistons 11a, 11b and 11c with a width W and a diameter D'. As shown in FIG. 8, the regulating openings 62a, 62b and 62c include, respectively, ⌣-shaped grooves 65a, 65b and 65c spaced apart from one another an angle of 120°, and ⌣-shaped grooves 66a, 66b and 66c formed at forward ends of pieces 63a, 63b and 63c connected at outer ends to cylinders 64a, 64b and 64c for movement in a horizontal direction to open and close the regulating openings 62a, 62b and 62c. To facilitate the introduction of the pistons 11a, 11b and 11c, the ⌣-shaped grooves 65a, 65b and 65c are chamfered at their forward ends 67a, 67b and 67c respectively. By causing shoulders formed at the forward ends of ⌣-shaped grooves 66a, 66b and 66c to abut against grooves 68a, 68b and 68c formed at the forward ends of the pieces 63a, 63b and 63c, respectively, it is possible to maintain the diameter D' of the regulating openings 62a, 62b and 62c formed from four directions within a range of an error of 20 μm.

Figure 7:
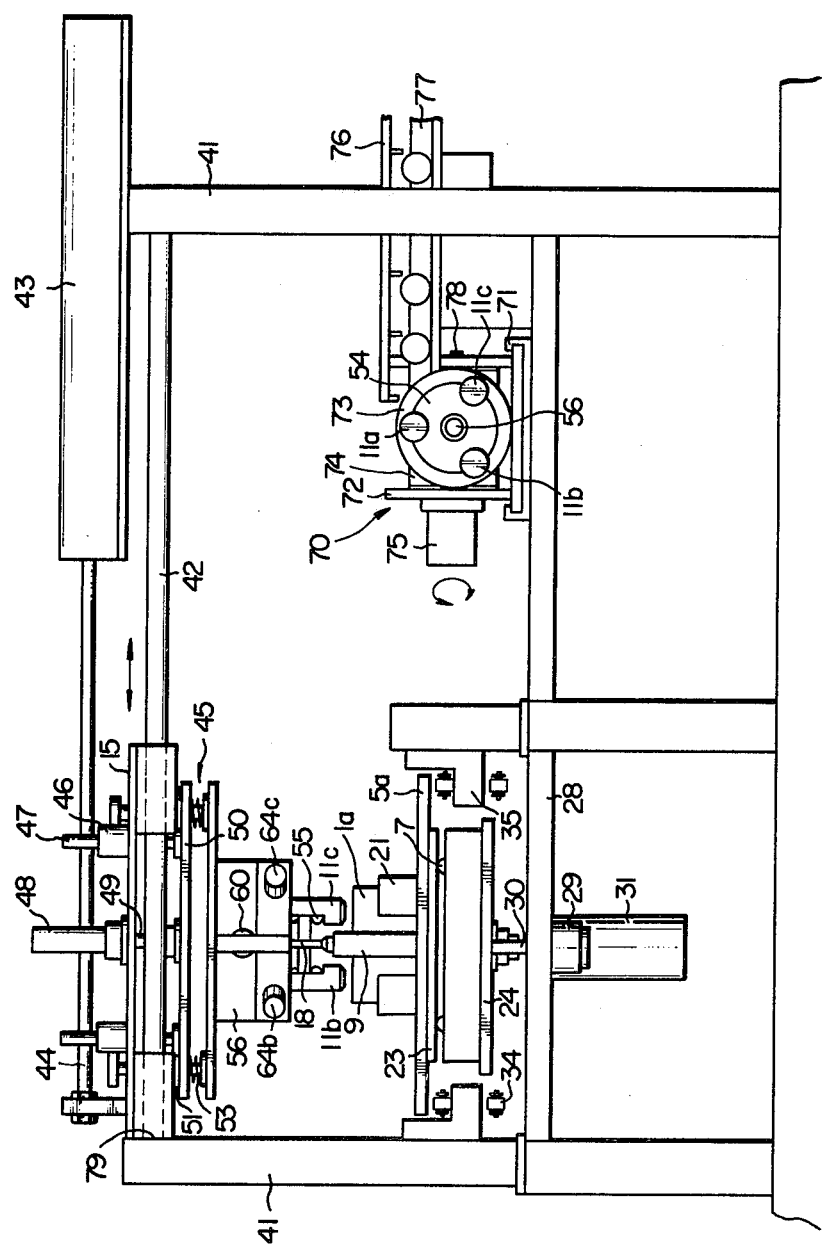
FIG. 7 is a side view of FIG. 6.

70 designates an assembling means for assembling, in the supply station, the pistons 11a, 11b and 11c with the inclined disk 54 and inserting the assembly in the main body portion 56 of the fitting jig 45 to be supported therein. As shown in FIG. 7, the assembling means 70 includes a supporting member 74 supporting an index table 73 for intermittent rotation through 120°, the index table 73 mounting thereon chucks (not shown) each for gripping one of the pistons 11a, 11b and 11c, a main frame 72 supported by a shaft 78 for rotating the supporting member 74 from the horizontal direction to the vertical direction by means of a motor 75 and movable along rails 71 for reciprocatory movement for a predetermined distance by the action of a cylinder (not shown) or the like, and guide rails 77 for holding the piston 11 and the bearings 55 assembled in the preceding step and bringing the piston 11 and bearings 55 into engagement with a feed pawl 76 which moves through a course ⌐⌐ so as to successively supply the pistons 11 with bearings 55 to the top of the disk 54.

As aforesaid, the pistons 11 having the bearings 55 in their grooves are held by the guide rails 77 and successively fed by the feed pawl 76, and the pistons 11 with bearings 55 are each held by a chuck mounted on the index table 73 which rotates intermittently through 120° so as to assemble the pistons 11a, 11b and 11c with the inclined disk 54. Then the main frame 72 is moved rearwardly, the inclined disk 54 is released from engagement at its outer periphery with the terminal ends of the guide rails 77 which are twisted, the supporting member 74 is rotated from the horizontal direction in the vertical direction through 90°, and the fitting jig 45 located above the assembling means 70 is moved downwardly by the action of the cylinder 48. By this operation, the shaft 56a is inserted in the bore 58 formed in the main body portion 56 and at the same time the pistons 11a, 11b and 11c are introduced into the grooves 65a, 65b and 65c respectively. When the end surface 59 of the flange of the shaft 56a abuts against the lower end of the main body portion 56, the cylinder 60 is actuated to move the engaging member 61 forwardly to hold the shaft 56a and at the same time the chucks on the index table 73 are released. Thus the objects of interests are gripped by the fitting jig 45 in the supply station.

Then the cylinder 48 is actuated to move the fitting jig 45 upwardly, and the cylinder 45 is actuated to move the fitting jig 45 from the supply station to an interfitting station, where the fitting jig 45 abuts against a stopper 79 formed at the upper end of one of the posts 41 so that the jig 45 can stop in a position which is precisely as planned. Thereafter the cylinders 64a, 64b and 64c in the fitting jig 45 are actuated to move the pieces 63a, 63b and 63c forwardly to regulate the movements of the upper end portions of the pistons 11a, 11b and 11c which define the regulating openings 62a, 62b and 62c respectively. Now the cylinder 48 is actuated again to move the jig 45 downwardly. By this operation, the pistons 11a, 11b and 11c are fitted in the holes 2a, 2b and 2c respectively while the pistons 11a, 11b and 11c move in fine movement through the bearings 55 with respect to the inclined disk 54, thereby completing an interfitting operation.

An error $E_4$ may occur in the pitch P between the holes 2a and 2b of the object 1, between the holes 2b and 2c thereof and between the holes 2c and 2a thereof. However, (A') the condition for positioning is such that the relation expressed by the following equation (13), in place of equation (4), must hold:

$$2|E_1|+2|E_2|+2|E_3|+E_4 \leqq 2C_1+2C_2 \qquad (13)$$

(B') the condition for determining the posture and (C') condition for fitting are the same as in interfitting one shaft member and one hole with each other.

(D') However, there is a condition which must be satisfied in effecting multishaft and multihole interfitting. More specifically, as shown in FIG. 7, it is necessary that the pistons 11a and 11b can be introduced into the holes 2a and 2b respectively, in spite of the presence of an error $E_4$ in the positions of the holes with respect to pitch.

$$P + (D' - d_{max}) \geqq P + |E_4| - (D_{min} - d_{max}) \qquad (14)$$
Therefore, $D' + D_{min} - 2 d_{max} \geqq |E_4|$ Thus, if the error in pitch of the holes 2a and 2b is kept below 0.1 mm, then equations (13) and (14) can be satisfied and it is possible to smoothly carry out interfitting of more than two shafts and two holes. The presence of constricted portions in the guide pin receiving tubular members 9 and the guide pins 18 enables the object 1 and the shaft members 11 to guide themselves after the shaft members and the holes 2 in the object 1 have been interfitted, instead of by the guide pin receiving cylindrical members and the guide pins.

From the foregoing description, it will be appreciated that in the present invention the shaft portion 11 of a diameter d which is the object of interest is loosely inserted in the regulating opening 19 of a width W and a diameter D' formed in the fitting jig 14 for free move-table means being supported for slight movement in a horizontal direction;

means for vertically moving said fitting jig means so that said shaft members and said holes in said object may move toward each other; and guide means comprising guiding members and guided members mounted at said fitting jig means and said table means respectively, said guiding members and said guided members being brought into engagement with each other when said fitting jig means moves toward said table means so that the guiding members may guide the guided members for slightly moving the table means in a horizontal direction to thereby position horizontally relative to each other said shaft members and said holes in the object within a range of the chamfers formed at the forward ends of the shaft members and chamfers formed at the entrance to said holes, said guiding and guided members being relieved horizontally when the chamfers being to engage each other;

said fitting jig means being further moved horizontally by said moving means to fit the shaft members in the holes in the object by utilizing the chamfer-to-chamfer engagement, whereby interfitting of said plurality of shaft members and said plurality of holes in the object with each other can be effected by exerting a fitting force on the shaft members from outside a jamming area.

5. Interfitting apparatus as claimed in claim 4, wherein said guiding members of said guide means are rod-like members each chamfered at its forward end and formed with a constricted portion on the rear side of a shaft portion of a maximum diameter thereof, and said guided members thereof are hollow tubular members each formed with a relief in its rearward portion.

6. Interfitting apparatus as claimed in claim 4, wherein the X-coordinate $X_f$ of said fitting force exerted from outside said jamming area satisfies $-D_{min}-\min[Xa+, b, Xa+, b+] < X_f < \min Xa+, b, Xa+, b+$ where:

$$Xa+, b = -(D_{min} \cdot \tan \lambda - h)/\tan \lambda + \tan \phi'\max$$
$$Xa+, b+ = -(D_{min} \cdot \tan \lambda - h)/[\tan \lambda + \tan (\phi'\max + \lambda)]$$
$$h = \sqrt{D^2\max + [D_{min} - d_{max} \cdot \cos \phi'\max]/\sin \phi'\max\,]^2 - D^2\min}$$
$$\phi'\max = (D' - d_{min})/W$$

$D_{min}$ is the minimum value of the inner diameter of the holes in the object;

$\lambda$ is the friction angle;

$d_{max}$ is the maximum value of the outer diameter of a shaft portion of the shaft members;

$D'$ is the inner diameter of the regulating openings;

$W$ is the length of the regulating openings.

7. Interfitting apparatus as claimed in claim 4, wherein said objects of interest include said plurality of shaft members arranged peripherally of an inclined disk secured to a shaft and formed with grooves each formed in the central portion of one of said shaft members for receiving therein bearings mounted on opposite sides of said inclined disk to permit the shaft members to move freely, and said objects include a plurality of cylindrical openings arranged peripherally each for fitting therein one of said shaft members for axial sliding movement.

* * * * *